United States Patent [19]

Yamaguchi

[11] Patent Number: 5,268,753
[45] Date of Patent: Dec. 7, 1993

[54] COLOR IMAGE FORMING APPARATUS AND METHOD THEREOF WITH COLOR-CORRECTING OPERATION

[75] Inventor: Toshiyuki Yamaguchi, Toyoake, Japan

[73] Assignee: Brother Kogyo Kabushiki Kaisha, Aichi, Japan

[21] Appl. No.: 745,709

[22] Filed: Aug. 16, 1991

[30] Foreign Application Priority Data

Aug. 20, 1990 [JP] Japan .................................. 2-219690

[51] Int. Cl.$^5$ ............................................ H04N 9/535
[52] U.S. Cl. ........................................ 358/527; 358/28
[58] Field of Search ........................ 358/75–80, 358/26–28

[56] References Cited

U.S. PATENT DOCUMENTS

| | | | |
|---|---|---|---|
| 3,825,673 | 7/1974 | Schreiner et al. | 358/28 |
| 3,982,273 | 9/1976 | Cochran | 358/28 |
| 4,458,265 | 7/1984 | Yoshida et al. | 358/80 |
| 4,941,038 | 7/1990 | Walowit | 358/80 |
| 4,959,711 | 9/1990 | Hung et al. | 358/80 |

Primary Examiner—Stephen Brinich
Attorney, Agent, or Firm—Oliff & Berridge

[57] ABSTRACT

A color image forming apparatus of the present invention is provided for reproducing on an image output medium an original color image formed on an image input medium, the image input and output media having first and second gamut, respectively. The color image forming apparatus obtains a color image data of the original color image for every picture element which is located inside of the first gamut. The color image data is color-compressed in a direction toward an achromatic color to obtain a color-compressed color image data located inside of the second gamut. The lightness value of the achromatic color is determined in accordance with a hue value of the color image data. The color-compressed color image data is transformed into a control signal data. A color image is recorded on the image output medium on the basis of the control signal data.

25 Claims, 7 Drawing Sheets

COLOR IMAGE FORMING APPARATUS AND METHOD THEREOF WITH COLOR-CORRECTING OPERATION

BACKGROUND OF THE INVENTION

The present invention relates to a color image forming apparatus such as a color copying machine, color printer, or the like for reproducing on an image output medium a color image corresponding to an original color image formed on an image input medium. The present invention further relates to a color image forming method. More particularly, the present invention relates to a color image forming apparatus and method thereof capable of reproducing a color image with sufficient reproducibility, even in the case where a color-reproducible range (gamut) of the image input medium is inconsistent with that of the image output medium.

There has been known a color image forming apparatus of a type in which an original color image formed on an image input medium is read out by an image reader to obtain an original image data for each of picture elements of the original color image. The original image data consists of digital signals of separated color components (such as red, green and blue components) representing density or reflective coefficient of the picture element color. The original image data is color-proofed or transformed into a control signal data. The control signal data will control a recording portion to reproduce on the image output medium a color the same as the picture element color on the image input medium. The control signal data consists of cyan, magenta and yellow color component control signals. The recording portion performs a recording operation with cyan, magenta and yellow color materials in accordance with the control signal data, to thereby reproduce a color image on an output medium corresponding to the original image on the input medium.

In the above-described image forming apparatus, the image formed or reproduced on the image input medium is determined with the original image data represented by an RGB color system. Then, the RGB system image data is converted into another data represented by a CMY color system through the color-proofing operation so that the CMY color materials may be recorded on the image output medium in accordance with the CMY color system.

The color-proofing operation is performed, since a color system used for determining or representing the image on the image input medium is different from that for reproducing or representing the image on the image output medium. In other words, the color-proofing operation is performed for transforming a color (first color) on the image input medium which is represented by one color system (first system) into another color (second color) represented by another color system (second system) so that the second color reproduced by the second system may become the same color as the first color formed by the first system.

The image input and output media include several types of media such as a photographic film, television, copy sheet, and coated or non-coated sheet. Color-reproducible ranges (gamuts) of the image input and output media are different from one another, in accordance with their manners of forming or reproducing colors thereon. There frequently occurs, therefore, such a case that the image input and output media for a single color image forming apparatus have their gamuts different from each other.

In the case where the image input gamut is thus inconsistent with the image output gamut, colors reproduced on the output medium are made different from colors of the original image which has been formed on the input medium, as a result of which color-reproducibility of the image forming apparatus is degraded. Furthermore, in the case where the gamut of the image input medium is larger than that of the image output medium, a color of the original image located inside of the image input gamut but outside of the image output gamut may not be reproduced on the image output medium.

In order to correct such a color-inconsistency and improve the color-reproducibility of the image forming apparatus, a color-compression processing is generally conducted before the above-described color-proofing. In other words, the color of the original image data obtained from the image input medium is subjected to a color-compression processing before subjecting to the color-proofing processing.

The color-compression technique (or a data-compression transform technique) is disclosed in Japanese Unexamined Patent Application Publication No.Sho 63-254889. In the color-compression technique, a color of the original image which is located inside of the image input gamut but outside of the image output gamut is compressed in a direction toward an achromatic color, thereby to be transformed into a color as located inside of the image output gamut. In other words, the color-compression process is conducted for shifting (color-compressing) a color within the image input gamut to a color within the image output gamut in a color space of a color system representing the original image data.

Since the thus color-compressed original image data is subjected to the color-proofing operation to be converted into a control signal data, the control signal data may control the recording portion to record, on the image output medium, such a color image having the same colors as the original image on the image input medium.

The achromatic color used in the color-compression processing is defined as a color having a lightness, but no hue and chromaticness (saturation). White, gray and black colors belong to the achromatic color, and are decreased in lightness in this order. In the following description, a color axis on which the achromatic colors having various lightnesses (white, gray and black) are located is referred to as an "achromatic color axis".

SUMMARY OF THE INVENTION

In the above-described conventional color-compression processing, the lightness value of the achromatic color is fixed for all the colors of the original color image.

In the color image forming apparatus with using the conventional color-compression technique, however, the color-reproducibility of the image forming apparatus is still insufficient.

An object of the present invention is, therefore, to provide an image forming apparatus and method thereof which is capable of correcting colors located outside of the image output gamut into colors located inside of the image output gamut to thereby reproduce a color original image with more excellent color-reproducibility.

The present inventor discovers that the color-reproducibility of the image forming apparatus using the conventional color-compression technique is insufficient, since the lightness value of the achromatic color toward which the original image colors are shifted is determined fixedly irrespective of hues of the original image colors. The present inventor further discovers that the reproducibility of the image forming apparatus may be improved by changing the lightness values of the achromatic colors in accordance with hues of original image colors.

In order to attain the above-described object, therefore, the present invention provides a color image forming apparatus for obtaining a color image data representing an original color of an original color image for every picture element, the original color image being formed on an image input medium having a first gamut, the gamut being defined as a color-reproducible range, and then forming a color image on an image output medium having a second gamut on the basis of the color image data, the color image forming apparatus comprising: image input means for obtaining a color image data of the original color image on the image input medium for every picture element, a color represented by the color image data being located inside of the first gamut; color-compression means for shifting the color image data in a direction toward an achromatic color by a degree, at least in the case where the color image data has a predetermined relationship with the second gamut, a color represented by the color-compressed color image data being located inside of the second gamut, a lightness value of the achromatic color being determined in accordance with a hue value of the color represented by the color image data, the color image data being replaced with the color-compressed color image data; and image recording means for recording a color image on the image output medium on the basis of the color image data.

The lightness value of the achromatic color increases as a hue value of the color represented by the color image data is closer to the hue value of a yellow color. The lightness value of the achromatic color decreases as a hue value of the color represented by the color image data is closer to the hue value of a blue color.

The color image forming apparatus may be further provided with color transforming means for transforming the color image data into a control signal data, wherein the image recording means records the color image on the image output medium on the basis of the control signal data.

According to another aspect, the present invention provides a color image forming apparatus for obtaining a original color data representing an original color of an original color image for every picture element, the original color image being formed on an image input medium having a first gamut, the gamut being defined as a color-reproducible range, and then forming a color image on an image output medium having a second gamut on the basis of the original color data, the color image forming apparatus comprising: storing means for storing a plurality of combination data representing relationships between a plurality of color-compressed color data and a plurality of control signal data corresponding thereto, the color-compressed color data being obtained from a plurality of color data by shifting the color data in a direction toward an achromatic color by a degree at least in the case where the color data has a predetermined relationship with the second gamut, the color-compressed color data being located inside of the second gamut, lightness value of the achromatic color being determined in accordance with hue value of the color represented by the color data, the control signal data being obtained by transforming the plurality of color-compressed color data; image input means for obtaining an original color data of the original color image on the image input medium for every picture element, a color represented by the original color data being located inside of the first gamut; selecting means for selecting more than one of the combination data in accordance with the original color data obtained by said image input means; interpolating means for interpolatively calculating an original control signal data for the original color data on the basis of the selected combination data; and image recording means for recording a color image on the image output medium on the basis of the original control signal data.

According to still another aspect, the present invention provides a color image forming method for obtaining a color image data representing an original color of an original color image for every picture element, the original color image being formed on an image input medium having a first gamut, the gamut being defined as a color-reproducible range, and then forming a color image on an image output medium having a second gamut on the basis of the color image data, the color image forming method comprising the steps of: obtaining a color image data of the original color image on the image input medium for every picture element, a color represented by the color image data being located inside of the first gamut; shifting the color image data in a direction toward an achromatic color by a degree to obtain a color-compressed color image data, at least in the case where the color image data has a predetermined relationship with the second gamut, a color represented by the color-compressed color image data being located inside of the second gamut, a lightness value of the achromatic color being determined in accordance with a hue value of the color represented by the color image data, the color image data being replaced with the color-compressed color image data; and recording a color image on the image output medium on the basis of the color image data.

According to another aspect, the present invention provides a color image forming method for obtaining a original color data representing an original color of an original color image for every picture element, the original color image being formed on an image input medium having a first gamut, the gamut being defined as a color-reproducible range, and then forming a color image on an image output medium having a second gamut on the basis of the original color data, the color image forming method comprising the steps of: forming a plurality of color data; shifting the color data in a direction toward an achromatic color by a degree to obtain a color-compressed color data, at least in the case where the color data has a predetermined relationship with the second gamut, the color-compressed color data being located inside of the second gamut, lightness value of the achromatic color being determined in accordance with hue value of the color represented by the color data, the color data being replaced with the color-compressed color data; transforming the plurality of color data into a plurality of control signal data; storing a plurality of combination data representing relationships between the plurality of color data and the corresponding plurality of control signal data; obtaining an original color data of the original color image on the image input medium for every picture element, a color represented by the original color data being located inside of the first gamut; selecting more than one of the combination data in accordance with the original color data; interpolatively calculating an original control signal data for the original color data on the basis of the selected combination data; and recording a color image on the image output medium on the basis of the original control signal data.

Other objects, features and advantages of the present invention will become apparent in the following specification and accompanying drawing.

DETAILED DESCRIPTION OF THE INVENTION

Figure 1:
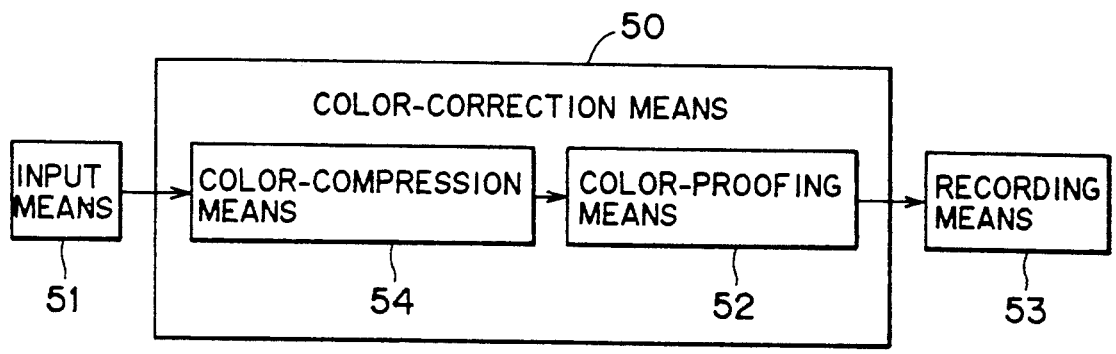
FIG. 1 is a block diagram of a first embodiment of an image forming apparatus of the present invention.

FIG. 1 is a block diagram of a basic construction of a first embodiment of a color image forming apparatus of the present invention.

The color image forming apparatus of the first embodiment basically includes: input means 51 for obtaining a color original image data corresponding to a color of each picture element of an original color image formed on an input image medium, the color original image data consisting of a plurality of digital signals of separated color components representing density data or reflective coefficient data of the each picture element color, values of which are quantized to a number of levels; color-correction means 50 for color-correcting the color original image data obtained by the input means 51 to produce control signal data for controlling a recording means 53, the color-correction means 50 including color-compression means 54 and color-proofing means 52, the color-compression means 54 subjecting the color original image data of the picture element color to a color-compression processing to shift the picture element color in a direction toward an achromatic color to thereby obtain a color-compressed color reproducible on an image output medium by recording means 53 and replace the color original image data with a compressed color original image data corresponding to the color-compressed color, in the case where the picture element color located inside of the image input medium gamut is located outside of the image output medium gamut; the color-proofing means 52 subjecting the color original image data to a matrix transformation to thereby obtain a control signal data for controlling recording means 53 to reproduce on the image output medium a color substantially the same as the picture element color on the image input medium; and recording means 53 for performing a color recording process using at least three coloring materials of cyan, magenta and yellow in accordance with the control signal data to thereby reproduce, on the image output medium, a color image corresponding to the original color image.

In the color-compression means 54, achromatic colors used for color-compressing the color original image data are different from one another in their lightness values, in accordance with hues of the colors of the respective picture elements of the original image on the image input medium.

Figure 2:
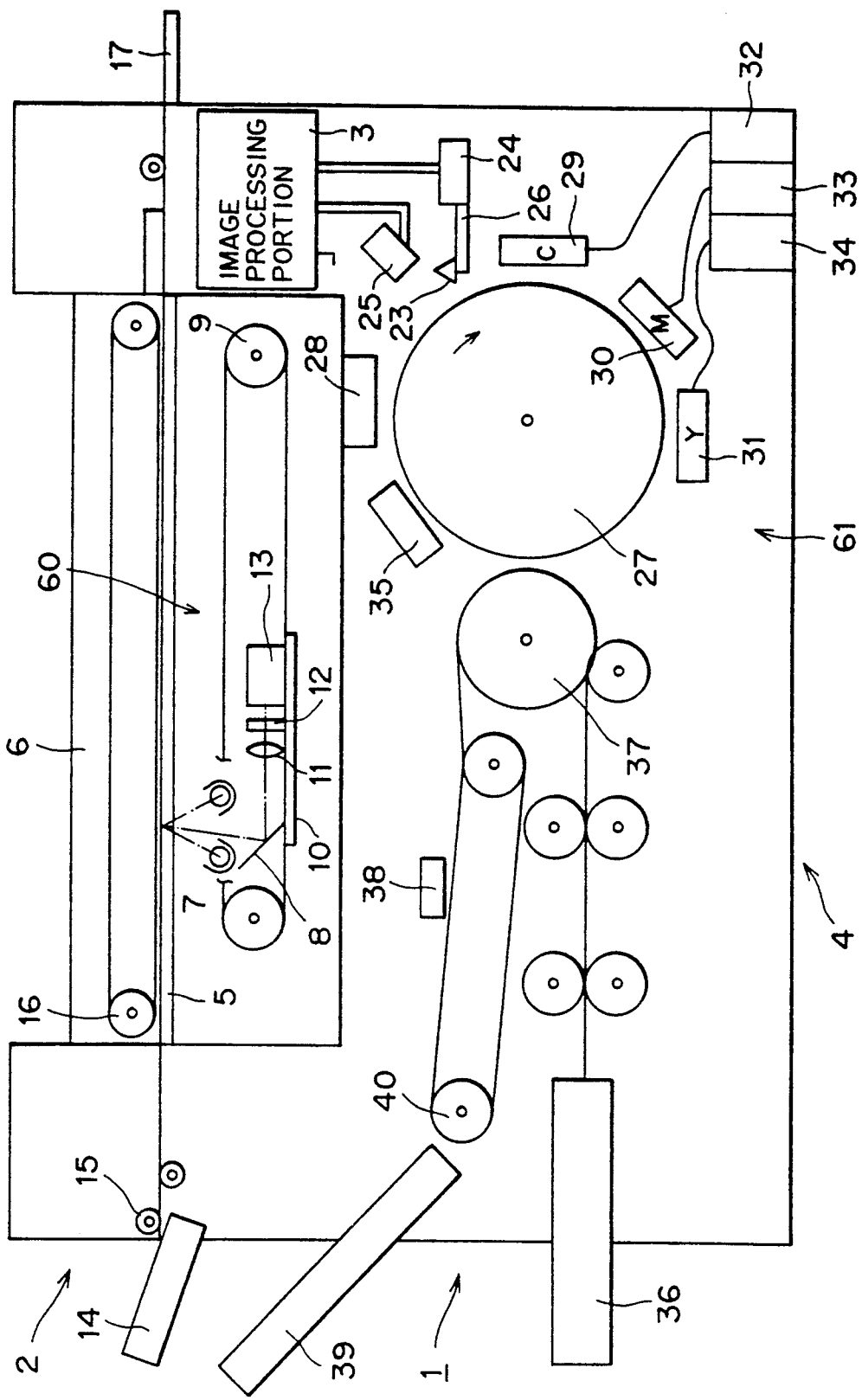
FIG. 2 shows a basic construction of a color image copying machine to which applied is the present invention.

FIG. 2 shows a representative construction of a digital color copying machine to which a first embodiment of the image forming apparatus of the present invention is applied.

The digital color copying machine 1 includes an original color image reading portion 2 provided at upper side of the copying machine 1, a color image processing portion 3 provided at a right side of the copying machine 1, and a color image recording portion 4 provided at a lower side of the copying machine 1.

The original color image reading portion 2 serves as the input means 51 shown in FIG. 1 for obtaining the original image data corresponding to a color image formed on an original mounted on the original mount 5.. The color image processing portion 3 serves as the color-compression means 54 and the color-proofing means 52 to thereby perform a color correction operation. The color image recording portion 4 serves as the recording means 53.

The original color image reading portion 2 includes a transparent original mount 5 for mounting an original thereon, an original cover 6 for pressingly covering the original mounted on the original mount 5, an original supply stand 14 for supplying the original to the original mount 5, an original supply unit 15 provided at a right side of the original supply stand 14 for supplying the original from the original supply stand 14 to the original mount 5, an original feeding unit 16 which comprises two rollers rotated by a motor (not shown) and an endless belt suspended therebetween for feeding the original onto the original mount 5, an original discharge tray 17 provided at a right side of the original feeding unit 16 for withdrawing an exposed original, and an image reading unit 60 provided at a lower portion of the original mount 5 for exposing the original to light to obtain an original color image data from the original.

The image reading unit 60 of the image reading portion 2 includes two light sources (e.g. fluorescent lamps) 7 each extending in a widthwise direction of the original (in a main scanning direction) for emitting light toward the transparent original mount 5 and irradiating the light to the original mounted on the original mount 5 to thereby scan the original with the light, a movable reflection mirror 8 for reflecting an original image light reflected from the original, a lens 11 for converging the original image light from the reflection mirror 8, a color filter unit 12 for separating the original image light from the lens 11 into three (red, green and blue) color image components, and a solid-state image pick-up element (e.g. a line charge-coupled device (line CCD)) 13 provided behind the color filter unit 12 for receiving the separated three primary color components of the original image light to produce an original color image data.

If the solid-state image pick-up element 13 comprises a line CCD, the line CCD reads out an image information for each line extending in a widthwise direction of the original (vertically to the drawing). The light sources 7, the movable reflection mirror 8, the lens 11, the color filter unit 12 and the solid-state image pick-up element 13 are mounted on a movable stand 10 which is moved by a moving unit 9 such as a pair of rotatable rollers in both right and left directions (in an auxiliary scanning direction) in FIG. 2.

Figure 3:
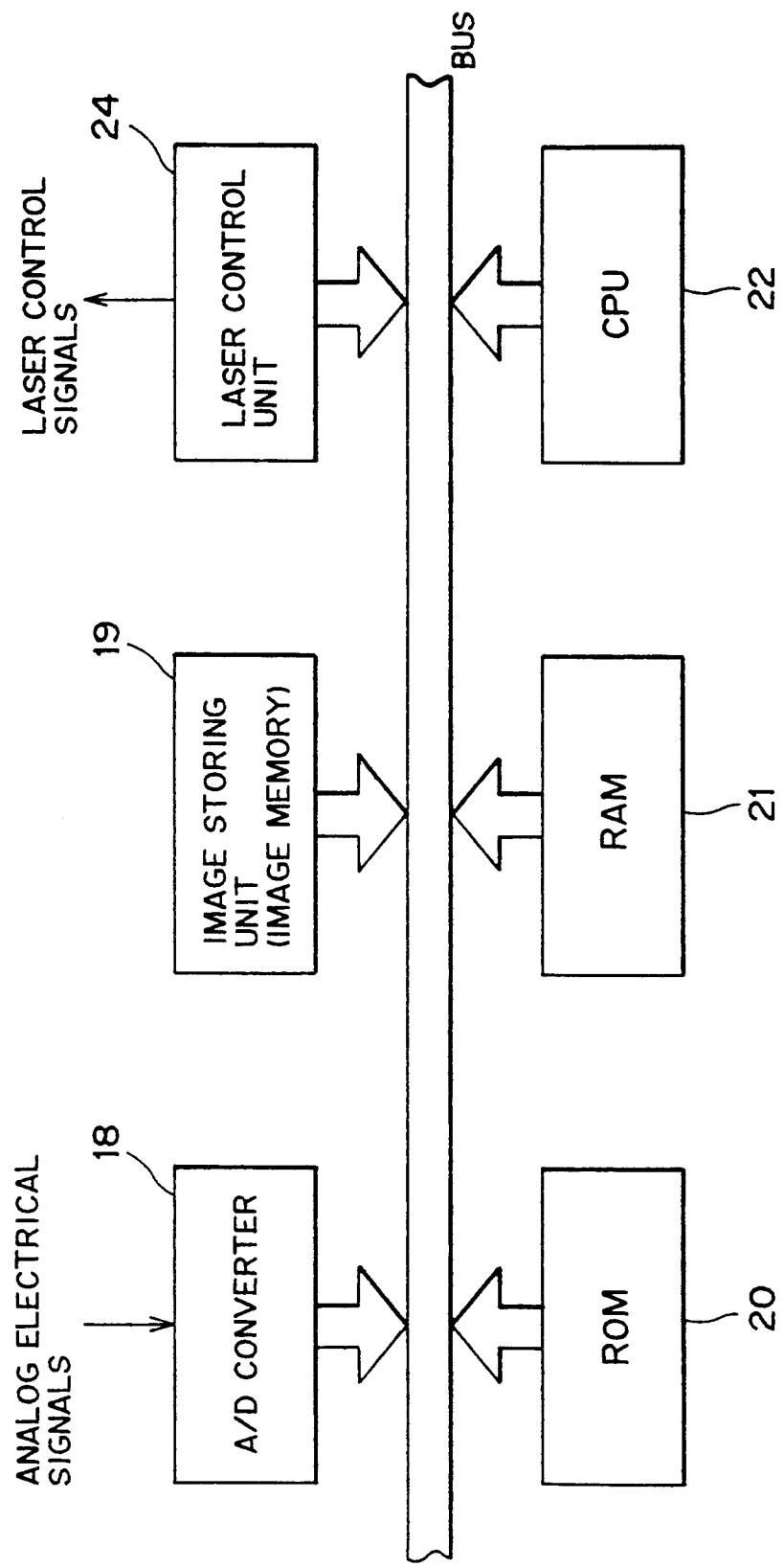
FIG. 3 is a block diagram for showing a color image processing system.

FIG. 3 is a block diagram for showing the color image processing portion 3.

As shown in FIG. 3, the color image processing portion 3 comprises an analog-to-digital (A/D) converter 18 for converting the analog original color image data (color information signal) produced by the solid-state image pick-up element 13 into a digital color original image data, an original image storing unit 19 such as an image memory or a frame memory for storing the digital color original image data of all or a part of the picture elements of the original image, a ROM 20 serving as storing means for beforehand storing therein color-correcting coefficients and various image processing operations, a RAM 21 for storing various data indicating various processing results, a CPU 22 for performing various image processings using the ROM 20 and RAM 21, and a laser control unit 24 for controlling the driving of a laser source 23 such as a laser diode of the image recording portion 4 on the basis of a printing control signal data produced for a color-corrected image data. These elements are connected to one another through a bus.

The filter unit 12 includes three filter members for allowing only respective ones of red, green and blue primary color components of light to pass therethrough. The three filter members successively cover the image pick-up element 13 to allow the respective three color components of the light from the original to be received by the image pick-up element 13, in each image reading operation of one main line or one frame. Therefore, image signals each representing brightness of each of three primary color components for every picture element are outputted from the image pick-up element 13. The image signals of the three color components for each picture element constitutes a color original image combination data representing color data of lightness, hue and saturation of each picture element. The image signals outputted from the image pick-up element 13 are converted into digital image signals by the A/D converter 18, and stored in the image storing unit 19.

The color image recording portion 4 includes the laser source 23 for emitting a laser beam, a laser modulation unit 26 for modulating the laser beam of the laser source 23 on the basis of the informations from the laser control unit 24 to thereby supply the modulated laser beam to a polygon mirror 25, an electrophotographical image forming unit 61 for electrostatically forming a latent image through an exposing operation using the modulated laser beam reflected from the polygon mirror 25 and then forming a visible image corresponding to the latent image on a recording sheet with toners, a fixing unit 38 for fixing the visible toner image on the recording sheet, and a sheet feeding unit 40 for discharging the recording sheet to a discharge tray 39.

The electrophotographic image forming unit 61 includes a photosensitive drum 27 on which the latent image is electrophotographically formed by the modulated laser beam from the polygon mirror 25, a charging unit 28 provided near to the photosensitive drum 27 for charging the photosensitive drum 27 uniformly negatively or positively before the exposing operation, a developer unit for coating the latent image with color toners to form a toner image on the photosensitive drum 27, the developer unit including a cyan developer 29 for coating cyan toners on a latent image which has been formed on the basis of a cyan color printing control signal, a magenta developer 30 for coating magenta toners on a latent image which has been formed on the basis of a magenta color printing control signal and a yellow developer 31 for coating yellow toners on a latent image which has been formed on the basis of a yellow color printing control signal, a toner supply unit including a cyan toner tank 32 for supplying the cyan toners to the cyan developer 29, a magenta toner tank 33 for supplying the magenta toners to the magenta developer 30 and a yellow toner tank 34 for supplying the yellow toners to the yellow developer 31, a cleaner 35 provided near to the photosensitive drum 27 for removing undesired toners on the photosensitive drum 27 after a transfer process, and a transfer drum 37 for transferring the toner images of cyan, magenta and yellow on the photosensitive drum 27 to a recording sheet which is supplied from a sheet supply case 36.

A color image forming operation of the digital color image copying machine 1 of this embodiment will be described hereinafter. In the embodiment, the original with the color original image serves as the image input medium, and the recording sheet with the cyan, magenta and yellow toner images serves as the image output medium.

A color original placed on the original supply stand 14 is fed onto the transparent original mount 5 by the original feeding unit 15 (the original may be manually placed on the original mount 5 after opening the original cover 6). A white light is irradiated from the light sources 7 to the original mount 5 while the light sources 7 are moved in an auxiliary scanning direction by the moving unit 9. Thus, the light sources 7 scan the entire surface of the original. The light beam is reflected at the original to thereby form an original image light corresponding to the color image on the original. The original image light is then reflected at the movable reflection mirror 8 and pass through the lens 11 and the filter unit 12. In the filter unit 12, a switching operation is carried out among the red, green and blue filters for every line or frame so that the red, green and blue filters may be successively supplied in front of the image pick-up element 13 in this order for every line or frame of the original. Thus, the red, green and blue color components of the original image light are successively received by the image pick-up element 13, where respective color components of the original image light are converted into corresponding electrical signals.

The analog image signals for each of the picture elements of the original color image are thus obtained by the image pickup element 13 of the image reading portion 2. Then, the image signals are transmitted from the image pickup element 13 into the color image processing portion 3. In the image processing portion 3, the analog image signals are first converted into digital image signals in the A/D converter 18. The digital image signals are stored in the image storing unit 19. The digital image signals for the three color components of each picture element constitute digital RGB original image combination data for defining the color state of the corresponding picture element of the original image.

Then, the following color-correcting processing is conducted by the CPU 22 to the digital RGB original image combination data for the respective picture elements stored the image storing unit 19. (Hereinafter, a color of each picture element to be subjected to the color correction is referred to as "a noted picture element color" for simplicity and clearness of the following description.)

Figure 4:
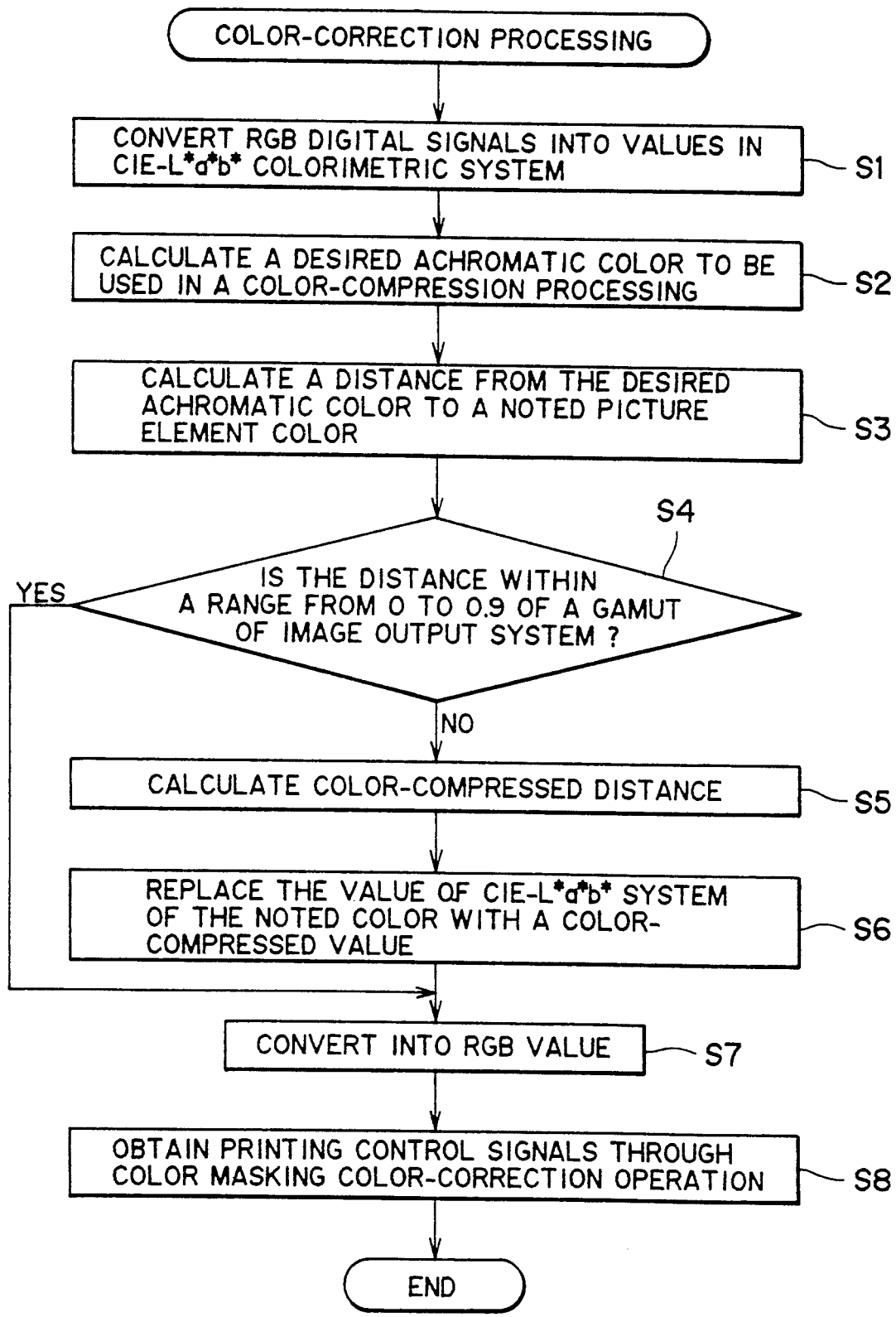
FIG. 4 is a flowchart for showing a color-correcting process.

FIG. 4 is a flowchart for conducting the color-correcting processing to a noted picture element color. The color-correcting processing includes a color-compression process steps S1 to S7 and a color-proofing process step S8.

The digital original image combination data for a noted picture element color composed of the three primary color component signals are converted into values of CIE-L*a*b* color system in a step S1. That is, the color is converted to a value in a CIE 1976 colorimetric system L*a*b* colorimetric system). If a Luther condition as disclosed by J.A.C. Yule, "Principle of Color Reproduction" is satisfied for the image reading portion 2, the input color (RGB color signals) can be linearly converted into a value in a CIE 1931 standard colorimetric system (XYZ colorimetric system). The value (X, Y, Z) in the CIE 1931 colorimetric system can be converted into a value ( L*, a*, b*) in the CIE 1976 L*a*b* colorimetric system by the following equation.

$$L^* = 116(Y/Yn)^{\frac{1}{3}} - 16 \quad (1)$$

$$a^* = 500\{(X/Xn)^{\frac{1}{3}} - (Y/Yn)^{\frac{1}{3}}\} \quad (2)$$

$$b^* = 200\{(Y/Yn)^{\frac{1}{3}} - (Z/Zn)^{\frac{1}{3}}\} \quad (3)$$

where Xn, Yn and Zn are three values of the CIE 1931 standard colorimetric system for a perfect diffusion surface.

Then, in a step S2, a color which is positioned on the achromatic color axis in the CIE 1976 L*a*b* colorimetric system and is to be used in a color compression operation for the noted picture element color is determined. (The color on the achromatic color axis to be used in the color compression operation is referred to as "desired achromatic color", hereinafter.)

The manner how the desired achromatic color is determined in the step S2 will be described hereinafter.

According to the present invention, lightness value L' of the desired achromatic color for the noted picture element color is determined in accordance with a hue value of the noted picture element color. In other words, the lightness values L' of the desired achromatic colors for the respective picture element colors are changed in accordance with hue values of the corresponding picture element colors. More specifically, it is preferable that the lightness value L' of the desired achromatic color for the picture element color increases as the hue value of the picture element color is closer to that of yellow color and that the lightness value L' of the desired achromatic color for the picture element color decreases as the hue value of the picture element color is closer to that of blue color. In other words, the smaller a difference between the hue values of the picture element color and the yellow color is, the higher the lightness value of the desired achromatic color for the picture element color becomes. The smaller the difference between the hue values of the picture element color and the blue color is, the lower the lightness value of the desired achromatic color for the picture element color becomes.

In order to determine the desired achromatic color having the above-described relation with the hue of the noted picture element color, the following equation is used in the step S2 to define the lightness value L' of the desired achromatic color.

$$L' = S + T \sin \{arctan (b/a)\} \quad (4)$$

where L' is a lightness value of the desired achromatic color (L* value in the CIE 1976 L*a*b* colorimetric system), a and b are a* and b* values of the noted picture element color in the CIE 1976 L*a*b* colorimetric system, and S and T are values which are to be obtained through experimental results. The value T is larger than 0. For example, S=60 and T=15. Since a hue value $\phi$ of the noted picture element color is defined as $\phi$=arctan (b/a), the lightness of the desired achromatic color is determined depending on the hue of the noted picture element color.

In accordance with the equation (4), the lightness value L' of the achromatic color changes in proportion to sine functional change of $\phi$, so that the lightness L' increases as the hue of the noted picture element color is shifted toward the yellow color but decreases as the hue of the noted picture element color is shifted toward the blue color, as follows.

In the case where the hue value of the noted picture element color is the same as or similar to that of yellow color, the hue value $\phi$ is almost 90 degrees. Therefore, the lightness value L' of the desired achromatic color becomes almost the highest value. On the other hand, in the case where the hue value of the noted picture element color is the same as or similar to that of blue color, the hue value $\phi$ is almost 270 degrees. Therefore, the lightness value L' of the desired achromatic color becomes almost the lowest value. Furthermore, in the case where the hue of the noted picture element color is positioned closer to the yellow color than to the blue color, the hue value $\phi$ is almost in a range of 0 to 180 degrees, so that the value sine $\phi$ is equal to or larger than 0 and the lightness value L' is equal to or larger than the value S. In the case where the hue of the noted picture element color is positioned closer to the blue color than to the yellow color, the hue value $\phi$ is almost in a range of 180 to 360 degrees, so that the value sine $\phi$ is equal to or lower than 0 and the lightness value L' is equal to or smaller than the value S.

Figure 5:
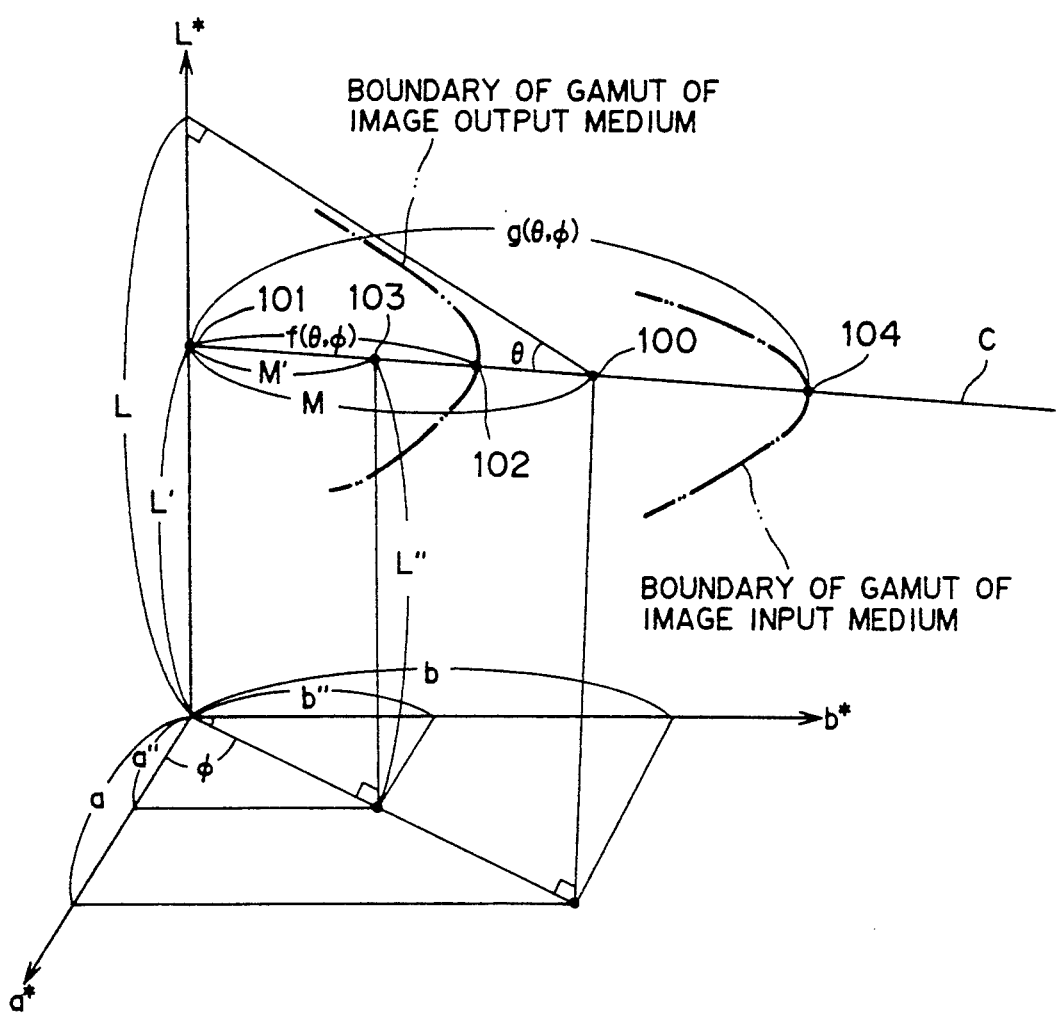
FIG. 5 is a schematic diagram for showing a distance from a color of a noted picture element to a desired achromatic color on an achromatic color axis.

In the color space of the CIE 1976 L*a*b* colorimetric system, a coordinate of the desired achromatic color 101 is determined as (L', 0, 0) with respect to the noted picture element color 100 having the coordinate (L, a, b), as shown in FIG. 5 where L is a lightness value of the noted picture element color (L* value in the CIE 1976 L*a*b* colorimetric system).

The desired achromatic color position 101 is thus determined in the step S2. As a result, a color-compression line C along which the noted picture element color 100 is to be subjected to color-compression is determined in the color space of the CIE 1976 L*a*b* colorimetric system. The color-compression line C is determined by connecting the noted picture element color 100 with the desired achromatic color 101, as shown in FIG. 5. The color-compression line C is thus defined by the hue and lightness directions, the hue direction being defined by the hue angle $\phi$ of the noted picture element and the lightness direction being defined by the angle $\theta$ defined by the following equation.

$$\theta = \arctan\{(L-L')/(a^2+b^2)^{\frac{1}{2}}\} \quad (5)$$

Then, in a step S3, a distance M noted picture element color distance) from the desired achromatic color 101 to the noted picture element color 100 along the color-compression line C is obtained according to the following equation.

$$M = ((L-L')^2 + a^2 + b^2)^{\frac{1}{2}} \quad (6)$$

Thus, the relative position of the noted picture element color 100 with respect to the desired achromatic color 101 is defined by the combination values of M and $\theta$ and $\phi$.

Then, in a step S4, it is judged whether the noted picture element color distance M is within a range from 0 to 90% of color distance $f(\theta, \phi)$ of image recording gamut or image output gamut, as will be described hereinafter.

The image recording gamut (image output gamut) color distance $f(\theta, \phi)$ is defined as a distance between the desired achromatic color 101 and a boundary color point 102 of a color-reproducible range (gamut) of the image output medium which is positioned on the color-compression line C, as shown in FIG. 5. The gamut of the image output medium is defined as a range in the color space reproducible by the image recording portion 4 on the image output medium (recording sheet) and is determined depending on the kind of the recording sheet and the recording manner conducted by the image recording portion 4. The image output gamut is as shown in FIG. 5, for example. The boundary color point 102 has the same hue and lightness directions from the desired achromatic color 101 as those of the noted picture element color 100 from the desired achromatic color 101, and therefore has a relative position defined by combination values of $f(\theta, \phi)$, and $\phi$ with respect to the desired achromatic color 101.

The distance $f(\theta, \phi)$ is, therefore, determined depending on the image output gamut and the hue and lightness directions $\theta$ and $\phi$ of the noted picture element color 100 with respect to the desired achromatic color 101. In the step S4, the distance $f(\theta, \phi)$ is first calculated before when the judgment whether the distance M is in a range from 0 to 90% of the $f(\theta, \phi)$ is conducted. Or, $f(\theta, \phi)$ may be selected from a table in the ROM 20 which stores therein a number of distance data $f(\theta, \phi)$ calculated previously for a number of combination data of $\theta$ and $\phi$.

If it is judged in the step S4 that the noted picture element color distance M is within a range from 0 to 90% of the image output gamut color distance $f(\theta, \phi)$, a color-compression processing steps S5 and S6 are not conducted, and processings proceed to a step S7. On the other hand, if it is judged that the noted color distance is out of the range, the noted color is subjected to the color-compression processing in a step S5 to obtain a color-compressed position 103 for the noted picture element color 100 which is defined by a new color distance M' from the desired achromatic color 101.

In the step S5, the new color distance M' defined between the color-compressed position of the noted picture element 103 and the desired achromatic color 101 is obtained by the following equation.

$$M' = f(\theta,\phi) - 0.1 f(\theta,\phi)\{g(\theta,\phi)-M\}/\{g(\theta,\phi)-0.9f(\theta,\phi)\} \quad (7)$$

where the value $g(\theta, \phi)$ is a color distance of image reading gamut (image input gamut) and is defined as a distance between the desired achromatic color 101 and a boundary color point 104 of a color-reproducible range (gamut) on the image input medium (original), the boundary color point 104 being positioned on the color-compression line C, as shown in FIG. 5. The gamut of the image input medium is defined as a range reproducible or formable on the image input medium (original) and readable by the image reading portion 2. The image input gamut is determined depending on both the kind of the original and the manner applied for forming the original image thereon. The image input gamut is also shown in FIG. 5, for example.

The boundary color point 104 has the same hue and lightness directions from the desired achromatic color 101 as those of the noted picture element color 100 from the desired achromatic color 101, and therefore has a relative position defined by combination values of $g(\theta, \phi)$, $\theta$ and $\phi$ with respect to the desired achromatic color 101.

The distance $g(\theta, \phi)$ is, therefore, determined depending on the image input gamut and the hue and the lightness directions $\theta$ and $\phi$ of the noted picture element color 100 with respect to the desired achromatic color 101. In the step S5, before the color-compression processing, the distance $g(\theta, \phi)$ is calculated or selected from another table in the ROM 20 which stores therein a number of distance data $g(\theta, \phi)$ calculated previously for a number of combination data of $\theta$ and $\phi$.

Figure 6:
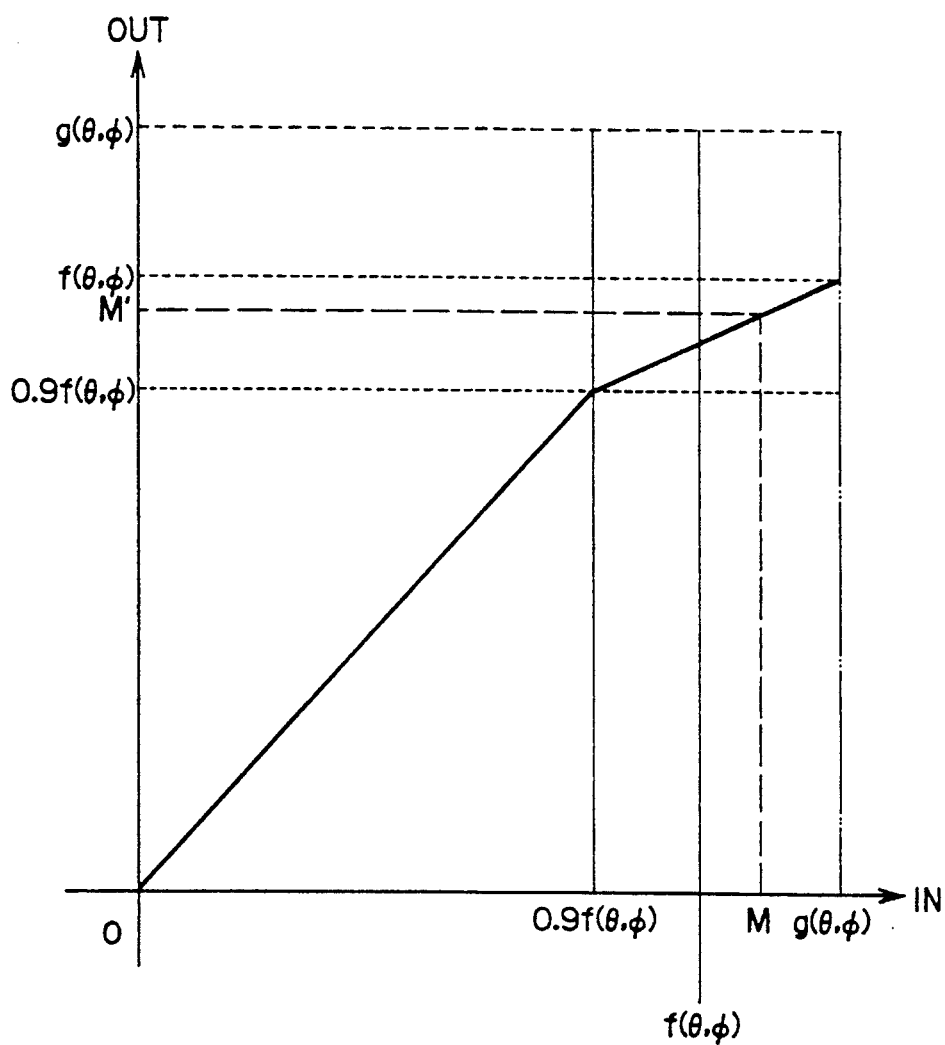
FIG. 6 is a schematic diagram for showing a color-compression transforming of the noted picture element color.

FIG. 6 is a schematic diagram for showing the above-described manner of obtaining the new color distance M' in the color-compression processing.

The color-compressed noted color 103 for the noted picture element color 100 is obtained by moving the noted picture element color 100 along the line C in a direction toward the desired achromatic color 101 by a color-compression amount A obtained by the following equation.

$$\begin{aligned} A &= M - M' \\ &= \{(L-L')^2 + a^2 + b^2\}^{\frac{1}{2}} - f(\theta, \phi) + \\ &\quad 0.1 f(\theta, \phi)\{g(\theta, \phi) - M\}/\{g(\theta, \phi) - 0.9 f(\theta, \phi)\} \end{aligned} \quad (8)$$

Thus, the noted picture element color 100 having such a relative position defined by M, $\theta$ and $\phi$ with respect to the desired achromatic color 101 is color-compressed to a new position 103 as defined by M', $\theta$ and $\phi$. Thus, the noted picture element color 100 is shifted to the color-compressed color 103 with its hue value $\phi$ being maintained to be unchanged. FIG. 5 shows also the position of the color-compressed noted color 103. As apparent from FIG. 6, the color-compressed color as defined by the equation (7) and as positioned on the color point 103 is located inside of the image output gamut or image recording gamut defined by the distance $f(\theta,\phi)$.

In a step S6, values in the CIE 1976 L*a*b* colorimetric system for defining the position of the color-compressed noted color 103 is obtained by the following equations, as shown in FIG. 5.

$$L'' = (L-L') M'/M + L' \quad (9)$$

$$a'' = a \, M' / M \quad (10)$$

$$b'' = b \, M' / M \quad (11)$$

where L", a" and b" are L*, a* and b* values of the color-compressed noted color 103 in the CIE 1976 L*a*b* colorimetric system.

In a step S7, this finally obtained combination data in the CIE 1976 L*a*b* colorimetric system for the color-compressed noted color 103 is reconverted to a color-compressed RGB image combination data. The color-compressed RGB image combination data has thus the same hue as the original RGB image combination data.

Then, in a step S8, the color-compressed RGB image combination data are subjected to a color-proofing operation, i.e., a matrix transformation as shown below, so that the color-compressed RGB image combination data are further color-corrected to form printing control signal data consisting of three (cyan, magenta and yellow) color printing control signals. This process is called as color masking operation.

$$\begin{vmatrix} C \\ M \\ Y \end{vmatrix} = \begin{vmatrix} a11 & a21 & a31 \\ a12 & a22 & a32 \\ a13 & a23 & a33 \end{vmatrix} \cdot \begin{vmatrix} R \\ G \\ B \end{vmatrix} \quad (12)$$

where R, G and B are red, green and blue digital color signals constituting the color-compressed RGB image combination data, C, M and Y are cyan, magenta and yellow printing control signals constituting the printing signal control data, and aij are color-correction coefficients calculated for the case where the color-compression processing is not performed.

In the case where the step S8 is conducted directly after the step S4, since the noted picture element color is not color-compressed, the printing control signal data are produced based on the RGB color signals constituting the noted picture element color.

All the picture element colors of the original image are subjected to the above-described color-correction operation one by one as the noted picture element color, as a result, the printing control signals C, M and Y for all the picture element colors are produced.

In order to obtain a further excellent reproducibility, the color-compression operation may be performed as will be described hereinafter.

If the noted color distance M is out of the range from 0 to 90% of the image output gamut color distance $f(\theta, \phi)$ but is smaller than $f(\theta, \phi)$, the color-compression amount A may be made smaller than that as obtained by the equation (8). If the noted color distance M is larger than the image output gamut color distance $f(\theta, \phi)$, the color-compression amount A may be made larger than that as obtained by the equation (8).

The printing control signals C, M and Y corresponding to cyan, magenta and yellow components of an image to be recorded are thus obtained through the above-described color correcting processing. The printing control signals C, M and Y are respectively transmitted to the laser control unit 24, and a laser light is modulated to be emitted in accordance with the control signals. The laser light is reflected at the polygon mirror 25, and then irradiated to the photosensitive drum 27 which are homogeneously charged by the charger 28, as a result of which a latent image is formed on the photosensitive drum 27.

Only either one of the cyan, magenta and yellow color toners are attachable to the latent image which is formed by the laser light controlled by corresponding one of the control signals C, M and Y. Therefore, toners from either one of the cyan, magenta and yellow developers 29, 30 and 31 are supplied on the latent image on the photosensitive drum 27, in accordance with the kind of the control signals used to form the latent image. As a result, the latent image is developed into a visible color toner image corresponding to the printing control signals. As a result, a visible color image with its colors being the same as those of the color image on the original is formed on the photosensitive drum 27. A recording sheet which has been supplied from the sheet supply case 36 is wound around the transfer drum 37, and then the developed toner image is transferred from the photosensitive drum 27 to the recording sheet. Residual toners on the photosensitive drum 27 are removed by the cleaner 35. The visible toner image transferred onto the recording sheet is then thermally fixed by the fixing unit 38. The recording sheet with the visible toner image fixed thereon are then transferred through the sheet feed unit 40 to be discharged to the output tray 39.

As described above, according to the image forming apparatus of the first embodiment, colors on the image input medium are color-compressed to be shifted in directions toward achromatic colors with their lightness values being different from one another in accordance with hues of the colors. Therefore, in the case where the image input medium gamut is inconsistent with the image output medium gamut, sufficient reproducibility can be attained.

Figure 8:
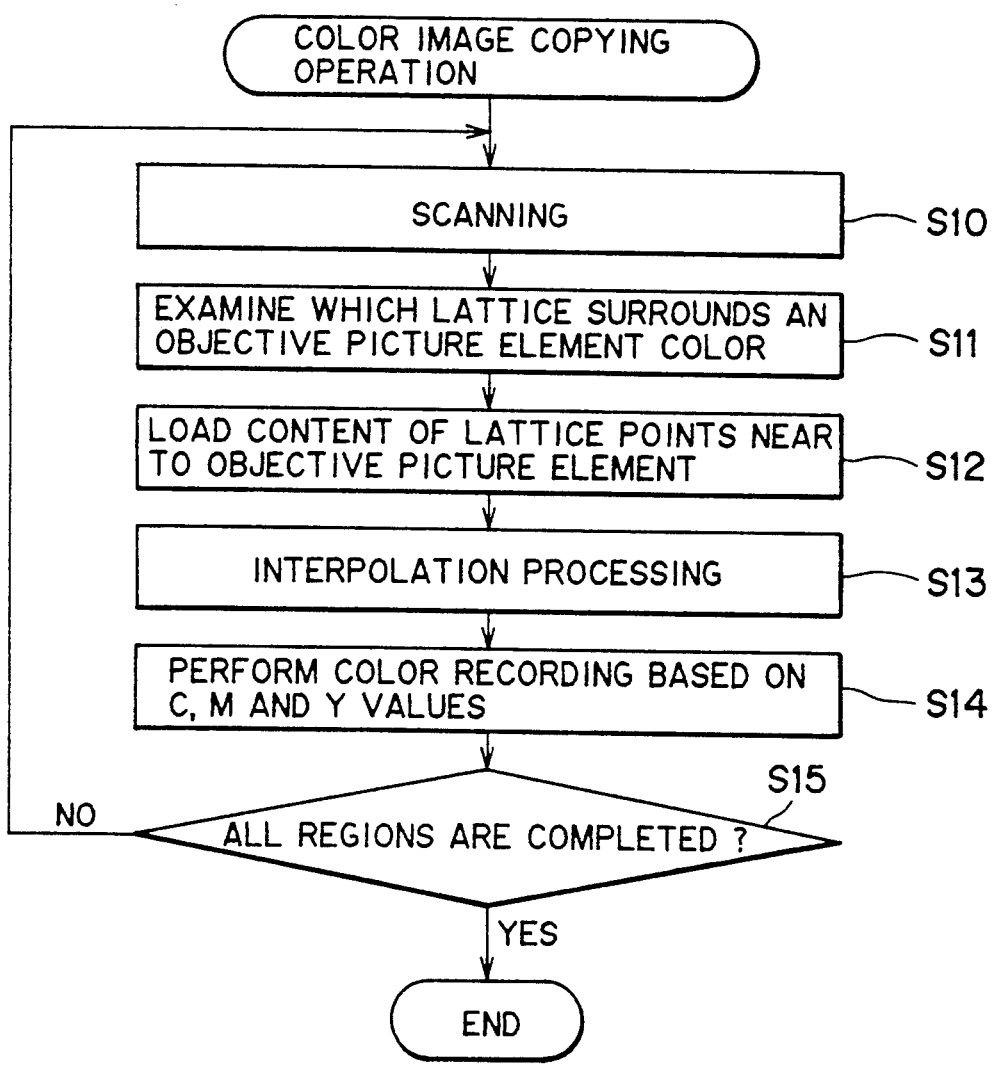
FIG. 8 is a flowchart for an interpolative processing in the second embodiment.

FIG. 8 shows a color image forming apparatus of a second embodiment of the present invention.

The color image recording apparatus of the second embodiment basically includes: color-compression means 54 for subjecting a color image data to a color-compression operation to shift the color image data in a direction toward an achromatic color to thereby obtain a color-compressed color reproducible on an image output medium by recording means 53 and replace the color image data with a compressed-color image data corresponding thereto, in the case where a color represented by the color image data located inside of an image input medium gamut is located outside of the image output medium gamut, the color image data consisting of a plurality of digital signals of separated color components representing density data or reflective coefficient data of colors to be reproduced on an image input medium, values of which are quantized to a number of levels; a color proofing means 52 for subjecting the color image data to a matrix transformation to thereby obtain a control signal data for controlling recording means 53 to record, on the image output medium, colors substantially the same as the color to be reproduced on the image input medium; storing means 55 for storing relationships between a plurality of color image data and a plurality of control signal data; input means 51 for obtaining a color original image data corresponding to a color of each picture element of an original color image actually formed on an image input medium; selecting means 56 for selecting several numbers of the control signal data from the storing means 55 in accordance with the color original image data obtained by the input means 51; an interpolating means 57 for subjecting the selected several numbers of the control signal data to an interpolating processing to thereby obtain a control signal corresponding to the color original image data obtained by the input means, the control signal capable of controlling recording means 53 to reproduce on the image output medium a color substantially the same as the picture element color on the image input medium; and recording means 53 for performing a color recording process using at least three coloring materials of cyan, magenta and yellow in accordance with the control signal to thereby reproduce, on the image output medium, a color image having the same colors as the original color image on the image input medium.

The color-compression means 54, the color-proofing means 52, the storing means 55, the selecting means 56 and the interpolating means 57 constitute a color-correction means 50 for color-correcting the color original image data obtained by the image input means 51 to produce the control signal for controlling the recording means 53.

In the color-compression means 54, achromatic colors used for color-compressing the color image data are different from one another in their lightness values, in accordance with hues of the respective colors to be reproduced on the image input medium.

In the first embodiment, colors actually reproduced on the image of the original (image input medium) are one by one subjected to the color-correction processing composed of the color-compression and color-proof processings, and printing control signals corresponding to the original colors are produced to be used for forming an image corresponding to the original image. On the other hand, according to the second embodiment, a plurality of colors representing a color space reproducible on the image input medium are beforehand subjected to the color-correction processings to thereby obtain printing control signals corresponding to the colors. The relationships between the control signals and the colors are stored in the storing means. When an image formed actually on one original (image input medium) is to be reproduced by the image forming apparatus, colors actually reproduced on the original are read out, and several numbers of control signals are selected from the storing means for each of the original colors. Then, interpolating processing is carried out for the several numbers of control signals to thereby obtain a control signal corresponding to the each original color. Based on thus obtained control signals, the original image is reproduced.

Figure 7:
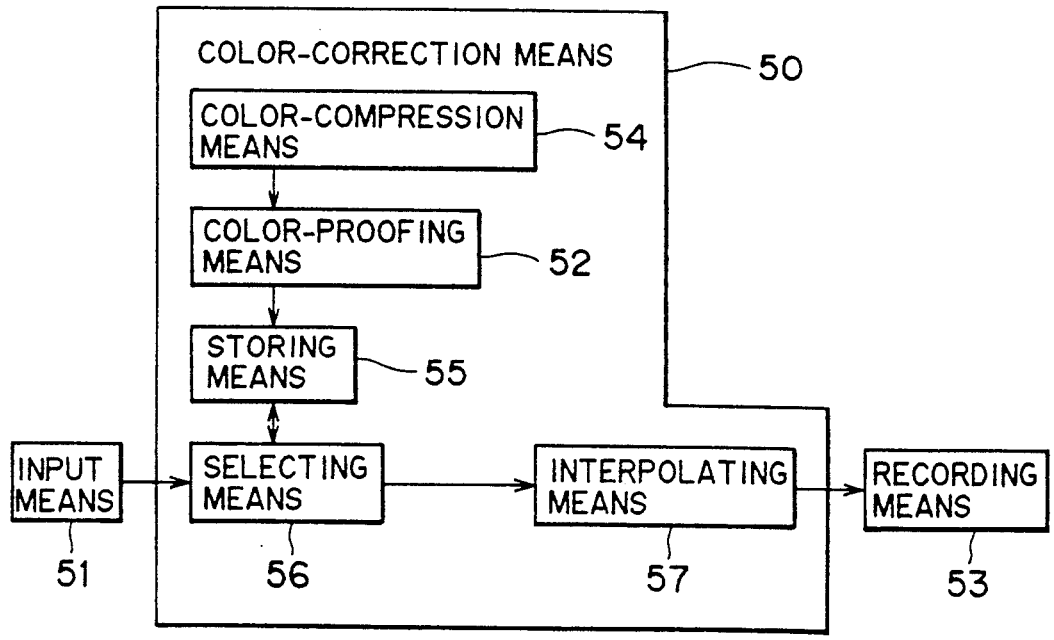
FIG. 7 is a block diagram for showing a second embodiment of the image forming apparatus of the present invention.

Constructions of an image forming apparatus 1 and a color image processing portion 3 to which the second embodiment is applied are substantially the same as those of the first embodiment as shown in FIGS. 2 and 3, except for an operation of the color image processing portion 3. In other words, the color image processing portion 3 serves as the color-compression means 54, the color-proofing means 52, the storing means 55, the selecting means 56 and the interpolating means 57. The original color image reading portion 2 and the color image recording portion 4 shown in FIG. 2 serve as the input means 51 and the recording means 53 shown in FIG. 7, as in the first embodiment.

The description of the same elements or functions with the first embodiment are therefore eliminated from the following description.

In the second embodiment, a three-dimensional color space is defined as being constructed by three R, G and B axes extending perpendicularly to one another. In the color space, an arbitrary color point (R, G, B) represents an arbitrary color inputtable to the color image processing portion 3 from the image input medium (original) through the image reading portion 2. The three dimensional axes are uniformly divided to thereby uniformly divide the color space into three-dimensional color lattice space.

With respect to colors located at all the lattice points in the lattice color space, the color-correction operation as described in the first embodiment are performed. All the lattice point colors are one by one subjected to the color-correction operation as the noted picture element color in the first embodiment. In other words, the steps S1 through S8 shown in FIG. 4 are conducted for all the lattice point colors. As a result, control signal combination data consisting of three printing control signals C, M and Y are obtained for the colors located at all the lattice points. The relationships between the lattice point colors and the calculated control signal combination data are stored as a look-up table in the ROM 20 in the image processing portion 3 shown in FIG. 3.

The operations of calculating the control signal combination data and storing the relationships between the lattice point colors and the control signal combination data are conducted before when the copying operation (color image forming operation) is actually performed. The calculating and storing operations may be conducted while the copying machine 1 is being manufactured before being sold, or may be conducted after it is sold but immediately before an operator actuates the copying machine to perform the copying operation.

The color copying operation of the image forming apparatus of the second embodiment is conducted as will be described hereinafter.

FIG. 8 shows the manner how a color image on the original is reproduced on a recording sheet.

When a color original is placed on the original mount 5, the white light from the light sources 7 scans an entire surface of the color original in the step S10, so that the digital original image combination data consisting of three color component digital signals R, G and B are obtained for all the picture elements of the color original. The manner of obtaining the digital original image combination data is the same as that conducted in the first embodiment.

Since each of the digital original image combination data is represented as a three-dimensional (R, G and B) color point in the color space, it is judged in the step S11 which lattice of the color lattice space includes the color point of the original image combination data. (The color of the original image combination data is referred as "objective color", hereinafter.) In other words, it is judged which colors located at lattice points surround the objective color. Then, in step S12, the control signal combination data corresponding to the lattice point colors surrounding the objective color are read out from the ROM 20.

Then, in step S13, interpolative processing is carried out for the objective color, using the following equation to obtain a printing control signal combination data consisting of three control signals C, M and Y.

$$Di = \left\{ \sum_{j=1}^{8} (Mj \times Lij) \right\} / \sum_{j=1}^{8} Mj$$

where Lij (i=C,M,Y) represents a control signal for the color located at the lattice point, Mj represents a volume of a rectangular parallelepiped lattice space which includes diagonal lattice points and the objective color, and Di represents a control signal for the objective color.

The printing control signal combination data consisting of the three (C, M and Y) control signals are thus obtained for the colors of all the picture elements of the original image, and are transmitted to the laser control unit 24, so that an image corresponding to the original image is formed on the recording sheet in steps S 14 and 15.

As described above, according to the image forming apparatus of the second embodiment, colors are color-compressed to be shifted in directions toward achromatic colors with their lightness values being different from one another in accordance with hues of the colors. Therefore, in the case where the image input medium gamut is inconsistent with the image output medium gamut, sufficient reproducibility can be attained. Furthermore, in the second embodiment, a plurality of relationship data between the colors and the printing control signals are previously calculated, and the printing control signal for the original image actually formed on the original is obtained through an easy interpolating processing based on the relationship data. Therefore, the color image processing may be performed rapidly, and the image reproducing operation may be attained in a quite short time.

According to the image forming apparatus of the present invention, colors on the image input medium are subjected to color-compression processing so that the colors may be shifted in directions toward achromatic colors with their lightness values being different from one another in accordance with hues of the colors. Therefore, in the case where the image input medium gamut is inconsistent with the image output medium gamut, sufficient reproducibility can be attained. Furthermore, it becomes possible to reproduce, with high reproducibility, the state how the hues of the colors of the picture elements are changed in the original image.

The present invention is not limited to the above embodiments, any modification may be made to the above embodiments without departing from the subject matter of this invention.

For example, the color-proofing operation may be eliminated, in the case where a colorimetric system used for representing the image on the input medium is the same as that for representing or reproducing the image on the output medium. Furthermore, the manner of color-proofing operation to obtain the printing control signals are not limited to the above-described manner.

Though it is judged whether the noted color distance M is within a range from 0 to 90% of the image output gamut color distance f $(\theta,\phi)$ in the step S4 of the color correction operation as shown in FIG. 4, the percentage value of 90 may be replaced with other values. In this case, the value of 0.9 appearing in the equations (7) and (8) may be changed in accordance with the replaced values. As apparent from the above, it may be judged in the step S4 whether the noted color distance M has a predetermined relationship with the image output gamut color distance.

Furthermore, in the color correction operation as shown in FIG. 4, the color-compression processing is not conducted in the case where the noted color distance M is within a range from 0 to 90% of the image recording gamut color distance $f(\theta,\phi)$. However, with respect to such the noted color having its distance M within the range, the color-compression processing may be performed, by changing the color-compression amount A defined by the equation (8) into a value of 0. In this case, the noted color is color-compressed into the same noted color. Such a color-compression processing with the color-compression amount A being 0 is equivalent to the fact that the color-compression processing is not conducted.

Though the original image is read out by the reading portion 2 to obtain the original image data in the above-described embodiments, the original image data may be directly inputted into the image processing portion 3. For example, R, G and B signals of a television may be inputted into the image processing portion 3 to thereby reproduce the television image on the recording sheet. In such a case, the image reading portion 2 may be neglected from the image forming apparatus. Similarly, the present invention may be applied to a color printer without the image reading portion 2.

Though the above embodiments adopt cyan, magenta and yellow color recording process, a black color may be added to these three colors to perform the color recording process.

I claim:

1. A color image forming apparatus for obtaining color image data representing an original color of an original color image for every picture element, the original color image being formed on an image input medium having a first gamut, the gamut being defined as a color-reproducible range, and then forming a color image on an image output medium having a second gamut on the basis of the color image data, said color image forming apparatus comprising:

image input means for obtaining color image data of the original color image on the image input medium for every picture element, a color represented by the color image data being located inside of the first gamut;

color-compression means for selectively color-compressing the color image data to obtain color-compressed color image data having a relationship with the second gamut said color-compressing means shifts the color image data in a direction toward an achromatic color by a certain amount to thereby produce color-compressed color image data, the achromatic color having a lightness value determined dependently on a hue value of the color represented by the color image data, a color represented by the color-compressed color image data being located inside of the second gamut; and image recording means for recording a color image on the image output medium on the basis of one of non-color-compressed color image data and the color-compressed color image data.

2. The color image forming apparatus as claimed in claim 1, further comprising color transforming means for transforming one of the non-color compressed color image data and the color-compressed color image data into control signal data, and wherein said image recording means records the color image on the image output medium on the basis of the control signal data.

3. The color image forming apparatus as claimed in claim 2, wherein the lightness value of the achromatic color increases as a hue value of the color represented by the color image data is closer to the hue value of a yellow color and the lightness value of the achromatic color decreases as a hue value of the color represented by the color image data is closer to the hue value of a blue color.

4. The color image forming apparatus as claimed in claim 3, wherein the lightness value L' of the achromatic color (L* value in the CIE 1976 L*a*b* colorimetric system) changes in proportion to a sine functional change of φ, where φ is the hue value of the color represented by the color image data.

5. The color image forming apparatus as claimed in claim 4, wherein the lightness value L' of the achromatic color (L* value in the CIE 1976 L*a*b* colorimetric system) is determined by the following equation:

$$L' = S + T \sin \phi$$

where φ is the hue value of the color represented by the color image data, S and T are fixed values.

6. The color image forming apparatus as claimed in claim 2, wherein the amount by which the color image data is shifted in the direction toward the achromatic color to obtain the color-compressed color image data is determined dependently on a location of the color represented by the color image data with respect to the second gamut.

7. The color image forming apparatus as claimed in claim 6, wherein an amount by which color image data representing a color located outside of the second gamut is shifted to obtain its color-compressed color image data is larger than an amount by which color image data representing a color located inside of the second gamut is shifted to obtain its color-compressed color image data.

8. The color image forming apparatus as claimed in claim 2, wherein the color image data consists of data representing brightnesses of red, green and blue components of color of each picture element of the original color image, the color-compressed color image data consists of data representing brightnesses of red, green and blue components of the color obtained by shifting the color represented by the original color image toward the achromatic color by said amount, and the control signal data consists of data representing densities of cyan, magenta and yellow components of color represented by one of the non-color-compressed color image data and the color-compressed color image data; and wherein said color transforming means performs a matrix transformation for one of the non-color-compressed color image data and the color-compressed color image data to thereby obtain the control signal data, the matrix transformation being represented by the following equation:

$$\begin{vmatrix} C \\ M \\ Y \end{vmatrix} = \begin{vmatrix} a11 & a21 & a31 \\ a12 & a22 & a32 \\ a13 & a23 & a33 \end{vmatrix} \cdot \begin{vmatrix} R \\ G \\ B \end{vmatrix}$$

where R, G and B are the red, green and blue components of one of the non-color-compressed color image data and the color-compressed color image data, C, M and Y are cyan, magenta and yellow components of the control signal data, and aij are color-correction coefficients.

9. The color image forming apparatus as claimed in claim 1, wherein said input means includes reading means for reading an original color image formed on an image input medium to thereby obtain the color image data representing the original color of the original color image for every picture element.

10. The color image forming apparatus as claimed in claim 1, wherein said color-compressed means shifts the color image data in the direction toward the achromatic color by said amount to obtain the color-compressed color image data when the color image data has such a relationship with the second gamut that a first color distance defined between the color represented by the color image data and the achromatic color has a value higher than 90% of a second color distance defined between the achromatic color and a boundary color positioned on a boundary of the second gamut, the achromatic color having the lightness value determined dependently on the hue value of the color image data.

11. A color image forming apparatus for obtaining original color data representing an original color of an original color image for every picture element, the original color image being formed on an image input medium having a first gamut, the gamut being defined as a color-reproducible range, and then forming a color image on an image output medium having a second gamut on the basis of the original color data, said color image forming apparatus comprising:

image input means for obtaining original color data of the original color image on the image input medium for every picture element thereof, a color represented by the original color data being located inside of the first gamut;

storing means for storing a plurality of combination data, said combination data including color data inputtable by said image input means and representative of color which is reproducible on the image output medium and which corresponds to color represented by the color data, the color represented by the color data being positioned inside of the first gamut and the color represented by the control signal data being positioned inside of the second gamut, the control signal data being obtained by selectively color-compressing the color data into color-compressed color data in such a manner that at least color data representing a color that has a relationship with the second gamut may be shifted in a direction toward an achromatic color by a certain amount to be converted into color-compressed color data and by transforming one of the non-color-compressed color data and the color-compressed color data into the control signal data, the achromatic color having a lightness value determined dependently on a hue value of the color represented by the color data the color-compressed color data being located inside of the second gamut;

selecting means for selecting more than one of the combination data in accordance with the original color data obtained by said image input means;

interpolating means for interpolatively calculating original control signal data for the original color data on the basis of the selected combination data, the original control signal data representing a color which corresponds to the color represented by the original color data and which is positioned inside of the second gamut; and image recording means for recording a color image on the image output medium on the basis of the original control signal data.

12. The color image forming apparatus as claimed in claim 11, wherein the lightness value of the achromatic color for the color data increases as a hue value of the color represented by the color data is closer to the hue value of a yellow color and the lightness value of the achromatic color decreases as a hue value of the color represented by the color data is closer to the hue value of a blue color.

13. The color image forming apparatus as claimed in claim 12, wherein the lightness value L' of the achromatic color (L* value in the CIE 1976 L*a*b* colorimetric system) for the color data changes in proportion to a sine functional change of $\phi$, where $\phi$ is the hue value of the color represented by the color data.

14. The color image forming apparatus as claimed in claim 13, wherein the lightness value L' of the achromatic color (L* value in the CIE 1976 L*a*b* colorimetric system) for the color data is determined by the following equation:

$$L' = S + T \sin \phi$$

where $\phi$ is the hue value of the color represented by the color data and S and T are fixed values.

15. The color image forming apparatus as claimed in claim 11, wherein the amount by which the color data is shifted in the direction toward the achromatic color to obtain the color-compressed color data is determined dependently on a location of the color represented by the color data with respect to the second gamut.

16. The color image forming apparatus as claimed in claim 15, wherein the amount by which the color data representing a color located outside of the second gamut is shifted to obtain the color-compressed color data is larger than an amount by which the color data representing a color located inside of the second gamut is shifted to obtain the color-compressed color data.

17. The color image forming apparatus as claimed in claim 11, wherein the color data comprises data representing brightnesses of red, green and blue components of color input by said image input means, the color-compressed color data comprises data representing brightnesses of red, green and blue components of the color obtained by shifting the color represented by the color data toward the achromatic color by said amount, and the control signal data comprises data representing densities of cyan, magenta and yellow components of color represented by one of the non-color-compressed color data and the color-compressed color data; and wherein the control signal data are obtained by performing a matrix transformation for one of the non-color-compressed data and the color-compressed color data, the matrix transformation being represented by the following equation:

$$\begin{vmatrix} C \\ M \\ Y \end{vmatrix} = \begin{vmatrix} a11 & a21 & a31 \\ a12 & a22 & a32 \\ a13 & a23 & a33 \end{vmatrix} \cdot \begin{vmatrix} R \\ G \\ B \end{vmatrix}$$

where R, G and B are the red, green and blue components of one of the non-color-compressed color image data and the color-compressed color data, C, M and Y are cyan, magenta and yellow components of the control signal data, and aij are color-correction coefficients.

18. The color image forming apparatus as claimed in claim 11, wherein said input means includes reading means for reading an original color image formed on an image input medium to thereby obtain the original color data representing the original color of the original color image for every picture element.

19. The color image forming apparatus as claimed in claim 11, wherein the control signal data is obtained by shifting the color data in the direction toward the achromatic color by said amount to obtain the color-compressed color data when the color data has a relationship with the second gamut such that a first color distance defined between the color represented by the color data and the achromatic color has a value higher than 90% of a second color distance defined between the achromatic color and a boundary color positioned on a boundary of the second gamut, and by transforming the color data into the control signal data in the case where the color data is not color-compressed and transforming the color-compressed color data into the control signal data in the case where the color data is color-compressed into the color-compressed color data, the achromatic color having the lightness value determined dependently on the hue value of the color data.

20. The color image forming apparatus as claimed in claim 11, wherein the control signal data of the combination data stored in said storing means controls said image recording means to record, on the image output medium, the color corresponding to the color represented by the corresponding color data.

21. A color image forming method for obtaining color image data representing an original color of an original color image for every picture element, the original color image being formed on an image input medium having a first gamut, the gamut being defined as a color-reproducible range, and then forming a color image on an image output medium having a second gamut on the basis of the color image data, said color image forming method comprising the steps of:

obtaining color image data of the original color image on the image input medium for every picture element, a color represented by the color image data being located inside of the first gamut;

selectively color-compressing the color image data to obtain color-compressed color image data in such a manner that at least color image data having a relationship with the second gamut may be shifted in a direction toward an achromatic color by an amount so as to be converted into color-compressed color image data, the achromatic color having a lightness value determined dependently on a hue value of the color represented by the color image data, a color represented by the color-compressed color image data being located inside of the second gamut; and recording a color image on the image output medium on the basis of the color image data in the case where the color image data is not color-compressed and on the basis of the color-compressed color image data in the case where the color image data is color-compressed.

22. The color image forming method as claimed in claim 21, further comprising the step of transforming the color image data into control signal data in the case where the color image data is not color-compressed and of transforming the color-compressed color image data into control signal data in the case where the color image data is color-compressed, and the color image is recorded on the image output medium on the basis of the control signal data.

23. The color image forming method as claimed in claim 21, wherein the color image data is shifted in the direction toward the achromatic color by said amount to obtain the color-compressed color image data when the color image data has a relationship with the second gamut such that a first color distance defined between the color represented by the color image data and the achromatic color has a value higher than 90% of a second color distance defined between the achromatic color and a boundary color positioned on a boundary of the second gamut, the achromatic color having the lightness value determined dependently on the hue value of the color image data.

24. A color image forming method for obtaining original color data representing an original color of an original color image for every picture element, the original color image being formed on an image input medium having a first gamut, the gamut being defined as a color-reproducible range, and then forming a color image on an image output medium having a second gamut on the basis of the original color data, said color image forming method comprising the steps of:

obtaining original color data of an original color image on an image input medium for every picture element, a color represented by the original color data being located inside of the first gamut;

selecting more than one of a plurality of combination data in accordance with the obtained original color data, each of the plurality of combination data including color data representative of color reproducible on the image input medium and control signal data representative of color which is reproducible on an image output medium and which corresponds to the color represented by the color data, the color represented by the color data being positioned inside of the first gamut and the color represented by the control signal data being positioned inside of the second gamut, the control signal data being obtained by selectively color-compressing the color data to obtain color-compressed color data in such a manner that at least color data representing a color that has a relationship with the second gamut may be shifted in a direction toward an achromatic color by an amount so that the color data is converted into color-compressed color data and by transforming the color data into the control signal data in the case where the color data is not color-compressed and transforming the color-compressed color data into the control signal data in the case where the color data is color-compressed into the color-compressed color data, the achromatic color having a lightness value determined dependently on a hue value of the color represented by the color data, color represented by the color-compressed color data being located inside of the second gamut;

interpolatively calculating original control signal data for the original color data on the basis of the selected combination data, the original control signal data representing color which corresponds to the color represented by the original color and which is positioned inside of the second gamut; and recording a color image on the image output medium on the basis of the original control signal data.

25. The color image forming method as claimed in claim 24, wherein the control signal data is obtained by shifting the color data in the direction toward the achromatic color by said amount to obtain the color-compressed color data when the color data has such a relationship with the second gamut that a first color distance defined between the color represented by the color data and the achromatic color has a value higher than 90% of a second color distance defined between the achromatic color and a boundary color positioned on a boundary of the second gamut, and by transforming the color data into the control signal data in the case where the color data is not color-compressed and transforming the color-compressed color data into the control signal data in the case where the color data is color-compressed into the color-compressed color data, the achromatic color having the lightness value determined dependently on the hue value of the color data.

* * * * *